(12) United States Patent
Evans (10) Patent No.: US 7,552,955 B2
(45) Date of Patent: Jun. 30, 2009

(54) HYBRID BUMPER WITH TRIM

(75) Inventor: Darin Evans, Spring Lake, MI (US)

(73) Assignee: NetShape Energy Management, LLC, Grand Haven, MI (US)

( * ) Notice: Subject to any disclaimer, the term of this patent is extended or adjusted under 35 U.S.C. 154(b) by 411 days.

(21) Appl. No.: 11/414,996

(22) Filed: May 1, 2006

(65) Prior Publication Data

US 2006/0255602 A1 Nov. 16, 2006

Related U.S. Application Data

(60) Provisional application No. 60/676,820, filed on May 2, 2005.

(51) Int. Cl.
*B60R 19/02* (2006.01)

(52) U.S. Cl. ...................................... 293/120

(58) Field of Classification Search ................. 293/120, 293/121, 132, 102, 149, 151, 154, 155; 196/187.11, 196/193.08
See application file for complete search history.

(56) References Cited

U.S. PATENT DOCUMENTS

| | | | | |
|---|---|---|---|---|
| 2,010,072 | A | * 8/1935 | Fergueson et al. | ........... 293/112 |
| 2,513,932 | A | 7/1950 | Grube | |
| 2,783,039 | A | 2/1957 | Wilson | |
| 3,578,358 | A | * 5/1971 | Reynolds | ..................... 280/500 |
| 3,838,872 | A | 10/1974 | Fullhart | |
| 3,865,416 | A | * 2/1975 | Burg | ......................... 293/135 |
| 3,868,098 | A | 2/1975 | Coombs | |
| 3,904,226 | A | 9/1975 | Smalley | |
| 3,990,722 | A | 11/1976 | Casad et al. | |
| 4,027,893 | A | 6/1977 | Drudge | |
| 4,225,167 | A | * 9/1980 | Buettner et al. | ............. 293/120 |
| 4,382,609 | A | 5/1983 | Hemmings | |
| 4,422,680 | A | * 12/1983 | Goupy | ........................ 293/122 |
| 4,431,212 | A | 2/1984 | Hirabayashi et al. | |
| 4,468,052 | A | 8/1984 | Koike | |
| 4,610,458 | A | 9/1986 | Garnham | |
| 5,054,806 | A | 10/1991 | Chester | |
| 5,620,218 | A | * 4/1997 | Saltzman et al. | ............ 293/117 |
| 6,139,044 | A | * 10/2000 | Smith et al. | ................. 280/505 |
| 6,149,181 | A | * 11/2000 | Biederman | ............... 280/491.1 |

(Continued)

FOREIGN PATENT DOCUMENTS

DE 004115812 11/1991

(Continued)

*Primary Examiner*—H Gutman
(74) *Attorney, Agent, or Firm*—Price, Heneveld, Cooper, DeWitt & Litton LLP (57) ABSTRACT

A hybrid bumper system includes a polymeric reinforcement beam with end sections and structural covers attached to the end sections to considerably strengthen the end sections. Bracketry stably supports the reinforcement beam on a vehicle frame. A fascia covers at least part of the reinforcement beam but leaves a portion of the structural covers in a visible position. The structural covers are treated for aesthetics, such as by painting, chroming, or other surface treatment. In one aspect, the beam includes a molded polymeric beam component, structural L-shaped covers attached to its end sections, and a tie bar along its rear side that stiffens and rigidifies a center of the polymeric beam component. In another aspect, a tow bar or rail-to-rail metal reinforcement beam front system (or rear with tow bar) is incorporated.

18 Claims, 4 Drawing Sheets

U.S. PATENT DOCUMENTS

| | | |
|---|---|---|
| 6,179,320 B1 | 1/2001 | Chou et al. |
| 6,199,924 B1 | 3/2001 | Oguri et al. |
| 6,250,664 B1 | 6/2001 | Tetrick |
| 6,318,775 B1 | 11/2001 | Heatherington et al. |
| 6,382,654 B1 | 5/2002 | Mahncke |
| 6,502,848 B1 | 1/2003 | Chou et al. |
| 6,581,955 B2 | 6/2003 | Aquinto et al. |
| 6,644,699 B2 * | 11/2003 | Anderson et al. ............ 293/102 |
| 6,644,701 B2 * | 11/2003 | Weissenborn et al. ....... 293/120 |
| 6,648,384 B2 | 11/2003 | Nees et al. |
| 6,648,385 B2 | 11/2003 | Frank |
| 6,655,721 B2 | 12/2003 | Hagen |
| 6,659,518 B2 | 12/2003 | Ponsonnaille et al. |
| 6,672,635 B2 * | 1/2004 | Weissenborn et al. ....... 293/120 |
| 6,695,368 B1 * | 2/2004 | Weykamp et al. ............ 293/154 |
| 6,814,379 B2 * | 11/2004 | Evans .......................... 293/117 |
| 7,303,219 B2 * | 12/2007 | Trabant et al. ............... 293/155 |
| 2002/0041078 A1 | 4/2002 | Aquinto et al. |
| 2002/0053782 A1 | 5/2002 | Peters |
| 2002/0105163 A1 | 8/2002 | Pierman et al. |
| 2003/0057720 A1 | 3/2003 | Nees et al. |
| 2003/0127829 A1 | 7/2003 | Tomita |
| 2003/0209915 A1 | 11/2003 | Yoshida |
| 2003/0218341 A1 | 11/2003 | Jonsson et al. |
| 2004/0217606 A1 * | 11/2004 | Weykamp et al. ............ 293/133 |

FOREIGN PATENT DOCUMENTS

| | | |
|---|---|---|
| JP | 9277811 | 10/1997 |
| JP | 2001063498 | 3/2001 |
| JP | 2005/075126 | 3/2005 |

\* cited by examiner

HYBRID BUMPER WITH TRIM

This application claims benefit of provisional application Ser. No. 60/676,820, filed May 2, 2005, entitled HYBRID BUMPER WITH TRIM.

BACKGROUND

The present invention relates to vehicle bumper systems, and in particular relates to a hybrid bumper system adapted to provide styling flexibility, cost effectiveness/competitiveness of and manufacture assembly, and high strength in combination with reduced weight, and high efficiency and predictability of energy management on impact in terms of amount of energy absorbed and amount of energy transmitted to the vehicle frame along each portion of a bumper crush sequence.

Bumper systems for modern passenger vehicles continue to evolve, both in terms of functional aspects and also aesthetics. These requirements are often conflicting, and hence there is a need for a hybrid bumper system adapted to take advantage of different materials while still maintaining optimal control of things such as assembly time, cost, and energy management. For example, recently, government and insurance standards are beginning to focus on optimizing bumper systems to provide reduced injury to pedestrians during impact while continuing to provide optimized energy management during high speed and low speed impacts. This requires that energy absorption and impact characteristics be designed with particular energy absorption profiles during different portions of the bumper stroke. However, the bumper system must accomplish the impact energy management while maintaining styling flexibility, low weight, low cost, high strength-to-weight ratio, and short lead times for tooling. Styling flexibility is required to permit product differentiation, including the ability to provide a chrome look. Preferably, the bumper system should use reusable and/or recyclable materials that are environmentally friendly. Also, it is desirable to minimize the number of components used in the bumper system, including such things as accessory mounting structure (e.g., an integrated fog lamp support structure, an integrated grill support structure), integrated air flow management, other integrated bumper functions (e.g. steps, license plate mounting, and/or towing capability), and the like.

In addition to functional requirements, it is desirable to provide a bumper system that is distinctive and that also offers the ability and flexibility to provide different aesthetics. However, customers typically want an integrated solution that looks well designed. It is typically not an acceptable solution to merely mount additional components onto the exterior of existing systems, since the result may have the appearance of an un-integrated component placed on the assembly as an afterthought. Also, "add on" components add weight and cost to the assembly without substantial benefit.

Hybrid bumper systems using components made of different materials provide an opportunity to optimize particular components for particular design requirements. However, this can also lead to an increase in the number of components and/or to an increase in assembly costs. Also, it can lead to a variety of quality problems related to mismatch of materials and their different properties at various temperatures. For example, dissimilar materials can result in dimensional control problems and tolerance/stack-up problems, thermal expansion problems and attachment difficulties causing inconsistencies and reduced durability, and the like.

Thus, a bumper system having the aforementioned advantages and solving the aforementioned problems is desired.

SUMMARY OF THE PRESENT INVENTION

In one aspect of the present invention, a hybrid bumper system for a vehicle includes a polymeric reinforcement beam having a center section and end sections, and includes bracketry stably engaging the reinforcement beam and adapted for attachment to the vehicle for supporting the reinforcement beam on a vehicle frame in a stable condition. A fascia covers at least a top portion of the reinforcement beam. Structural covers are attached to and cover at least part of the end sections of the reinforcement beam, the structural covers combining with the end sections to provide corner structures of greater strength than the end sections alone, but also including a visible surface not covered by the fascia.

In another aspect of the present invention, a bumper system for a vehicle includes a hybrid reinforcement beam made of a polymeric beam component and L-shaped structural cover components secured to outer end sections of the polymeric beam component. Bracketry stably engages the reinforcement beam and is adapted for attachment to the vehicle for supporting the reinforcement beam on a vehicle frame in a stable condition. A fascia covers at least part of a center section of the reinforcement beam and does not cover a visible portion of the L-shaped structural cover components. At least one of the fascia and structural components includes a surface treatment different than the other of the fascia and structural components.

In yet another aspect of the present invention, a bumper system for a vehicle includes a tow bar, and bracketry stably engaging the tow bar and adapted for attachment to the vehicle for supporting the tow bar on a vehicle frame in a stable condition. A reinforcement beam is attached to the bracketry and the tow bar. A fascia covers a portion of the reinforcement beam. Structural covers are attached to end sections of the reinforcement beam to form structural corners with the reinforcement beam.

An object of the present invention is a hybrid bumper system giving considerable savings in tooling costs, such as 20%, and a considerable weight savings, such as up to about 15% (e.g., about 25 pounds weight saved), yet with design flexibility.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
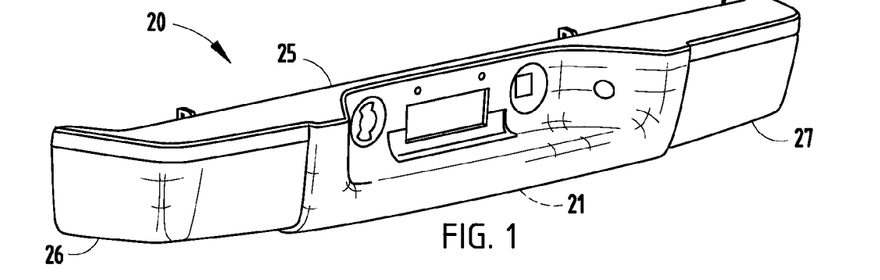
FIGS. 1-2 are front and rear perspective views of a rear bumper system embodying the present invention.

A hybrid bumper system 20 (FIGS. 1-3) for a vehicle includes reinforcement beam 24 adapted to be supported on the front rails of a vehicle frame by bracketry 22/23. A tow bar 21 extends through apertures in and engages the bracketry 22/23 such that the tow bar 21 is stably supported on the vehicle frame. The bumper system 20 further includes a fascia 25 covering a first portion of the reinforcement beam 24 and covering at least part of the tow bar 21, and includes structural covers 26/27 attached to ends of the reinforcement beam 24 for adding structure to the ends of the beam 24 and also for aesthetically covering the ends of the reinforcement beam 24 (along with fascia 25) as an assembly. In one aspect, the fascia 25 is made of a material that can be painted or chromed or molded in color. Also, the covers 26/27 are made of a material that can be painted or chrome-plated. It is contemplated that the covers that are painted can be made of a low-cost first material suitable for painting, and that identically-shaped second covers can be made of a second material adapted to be chrome plated. The existence of components 25-27 which can be selectively painted or chromed or formed using different shapes increases flexibility of the present design for meeting various product identification and aesthetic criteria for various vehicle models.

The tow bar 21 (FIG. 2) includes a tubular beam of sufficient strength to support a ball hitch for supporting and towing a trailer. The tow bar 21 is made to have a suitable strength based on the towing capacity required, and includes one or more holes 21' for receiving a ball hitch component.

The main support brackets 22 (FIG. 2) are mounts stamped from sheet metal for mounting the bumper system 20 to a vehicle frame 20'. Each bracket 22 includes a first end 30 for mounting to the vehicle frame, an extending section 31, and a second end 32 (illustrated as an apertured flange) with sufficient structure to stably engage and carry the tow bar 21.

The U-shaped stabilizing brackets 23 (FIG. 2) are also stamped from sheet metal and include an inner end 34 attached to sides of the brackets 22 and extend at an angle thereto to a second outer end 35 attached to the beam 24. The brackets 23 are adapted to support and stabilize an end of the beam 24. The illustrated brackets 23 are U-shaped and the brackets 22 also have a particular shape, but it is contemplated that the brackets 22 and 23 can be alternative shapes and configurations.

The illustrated reinforcement beam 24 (FIG. 2) is made of a structural plastic material, such as a composite or reinforced plastic material such as PC/PBT. (compound of polycarbonate and polybutylene terephthalate. It includes a variety of integrally-formed attachment structures, such as apertured bosses for receiving self-threading screws and/or includes pockets for receiving snap-in fasteners and clips 37, such as may be used for license plate attachment or wire management for wires extending to the vehicle exterior lamps, and holes for receiving bolts for attachment of brackets (22/23). It also includes apertures 38 and integrally-formed mounting structures for license plate lights, mounting structures 38' for cornering lamps, mounting structures for supporting clips and retainers for managing and holding wires extending to the license plate lights and cornering lamps, and the like. The ends of the beam 24 are enlarged and include reinforcing ribs and wall structure including a flat (or treaded/grooved/roughened) top surface forming steps.

The fascia 25 (FIG. 2) is a TPO (thermoplastic olefin) molded part adapted to matably fit onto and cover the beam 24, the brackets 22/23, and the tow bar 21. Specifically, the fascia 25 includes a top shelf section 41 that forms a step on the beam 24, and further includes a recessed center section 42 that covers a center of the tow bar 21 under the license plate area. Further, a U-shaped vertical wall 44 extends around the license plate area and connects the sections 41 and 42. However, the vertical wall 44 combines with the top shelf section 41 to form notches 45 and 46 which leave the side surfaces on ends of the beam 24 open and uncovered. It is contemplated that the fascia 25 could be made from a material that can be painted, molded in color, or selectively brightly finished for optimal appearance, depending on vehicle aesthetic requirements. The styling of this piece (24 or others) can also be changed without changing the base structure for product differentiation without having to re-engineer the system.

Figure 2:
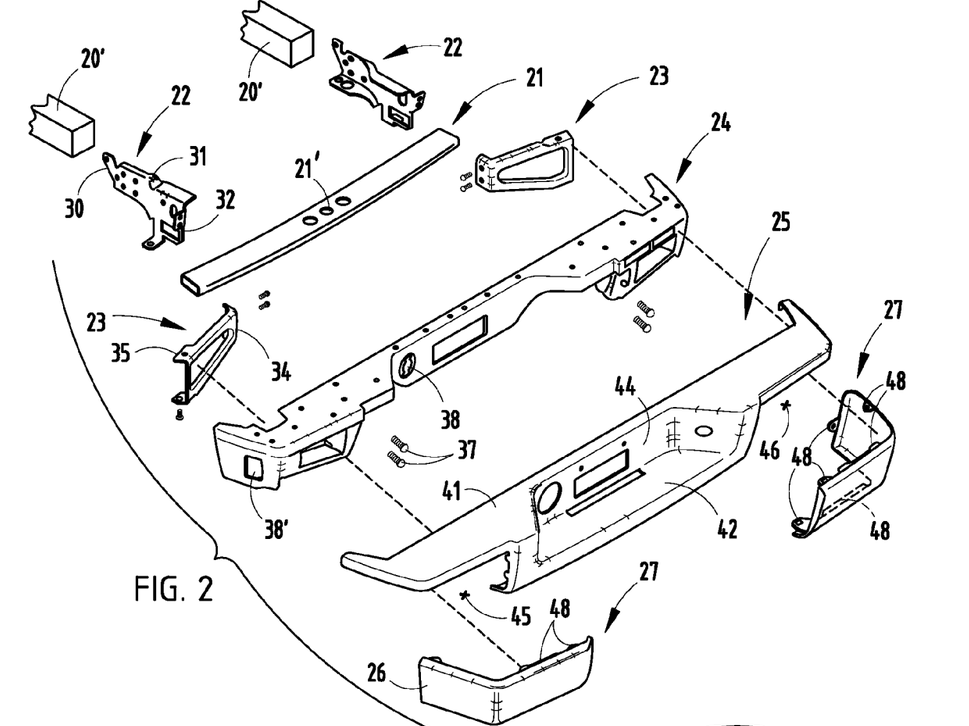
Figure 3:
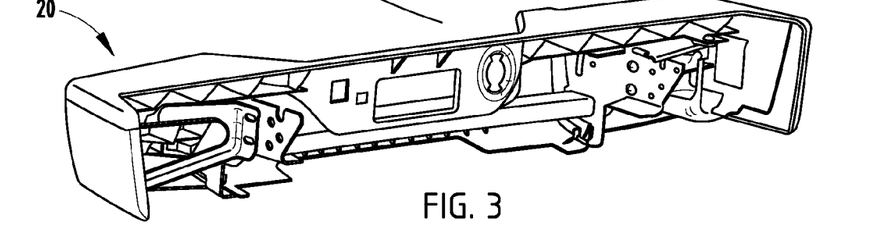
FIG. 3 is an exploded perspective view of the bumper system defined in FIG. 1.

The structural covers 26/27 (FIG. 2) are attached to flanges on the beam 24 in areas extending around and in front of the notches 45 and 46 in the fascia 25. The covers 26/27 are preferably made of a metal that can be formed and treated by painting or treated for a bright-surface, such as by chrome-plating. However, it is contemplated that in some bumper applications having relatively lower corner strength requirements, the covers 26/27 could be made of a structural polymeric material. Further, the covers 26/27 can be molded in color (plastic), or powder coated (plastic or metal) or chromed (plastic or metal) or covered to have a chrome or glossy or non-glossy appearance (plastic or metal.) Apertured flanges 48 are formed along edges of the covers 26/27 for attachment to the beam 24 and to the corner bracketry 23. The illustrated apertured flanges 48 are L-shaped, and are positioned along all four of the top, bottom, inboard and outboard edges of the covers 26/27 (FIG. 2). The shape and multi-edge attachment of the structural covers 26 and 27 to the beam 24 greatly increases a strength of the end sections of the beam, especially due to the L-shape of the covers and the openness of ends of the beam. However, it is contemplated that the apertured flanges 48 may only need to be attached along three edges, or along opposing edges, depending on the strength requirement of the ends of the beam 24, and depending a shape and strength of the beam ends (before attachment of the structural covers), and depending the strength of the attachment scheme, and depending on strength requirements of the bumper system and other functional requirements.

The existence of the structural covers 26/27 greatly increases the design flexibility for the shape of the polymeric beam 24, while maintaining the ability to provide high strength on ends of the beam 24. This can be important for corner impact, for providing a step on a top of the end of the beam, and for other structural reasons. For example, the polymeric beam 24 can be made with open areas in its ends or with thinner walls in its ends or with more open areas around its ends. Each of these items improve moldability, reduce weight, and allow product designers to customize the shape and structure of the assembled beam for optimal strength characteristics along specific areas of the beam . . . without making a complicated tool. Further, the tool for molding the beam 24 can be simplified by potentially eliminating the need to form undercuts on the ends of the beam. Still further, the present design eliminates a show surface on the extreme outboard end surface of the beam (i.e. that portion of the beam that is visible on a side of the vehicle). It is noted that it can be difficult to maintain a high quality surface on the extreme outboard end surface of a beam, since it is more difficult to maintain pressure on plastic in a direction perpendicular to the direction of die closure. (It is noted that the direction of die closure is normally perpendicular to a face of the beam, and not perpendicular to the outboard end surface of the beam.) As an aside, it is noted that the fascia 25 could be extended downwardly to cover the lower front surface of ends of the beam 24, but of course this would increase the expense of the fascia 25 and further would dramatically change the appearance of the present bumper assembly. Trim pieces give more freedom to style by using independent dies that otherwise would be complex and not easily formable due to complex geometrics of large parts.

Figures 4, 5, 6:
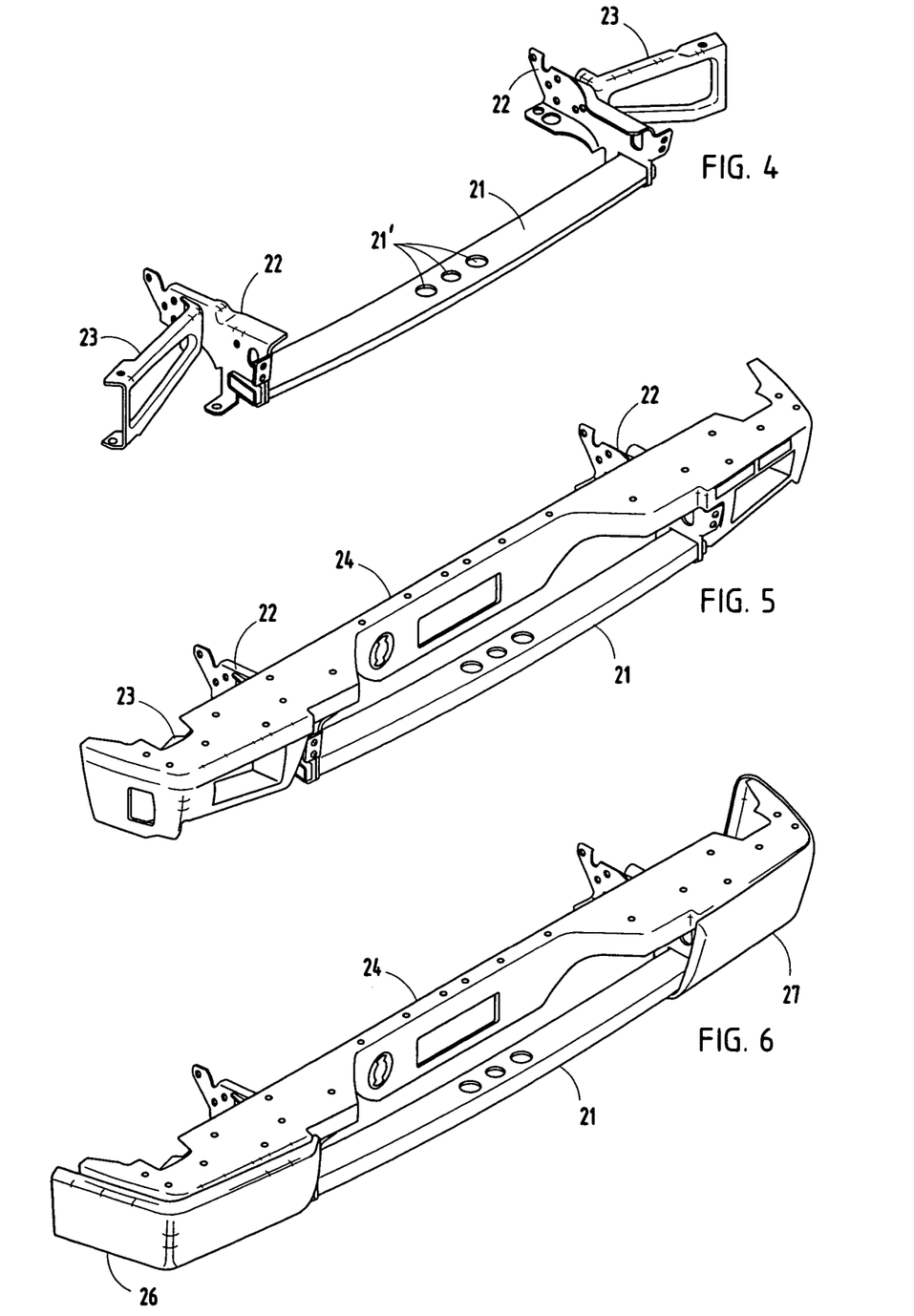
FIGS. 4-6 are perspective views showing successive steps of assembly.

A preferred assembly sequence for the components 21-27 is illustrated in FIGS. 4-6. Initially, the tow bar 21 is attached to the brackets 22 and 23, and the reinforcement beam 24 is secured by attachment of screws and fasteners. The covers 26/27 are selected with a desired surface finish (i.e., paint or chrome) and then attached to the reinforcement beam 24, and lastly, the fascia 25 is attached to the subassembly. The result is a very attractive modularly-styled bumper having chrome or paint as desired, yet which facilitates assembly and provides an aesthetic appearance, even with the tow bar 21 in place. Further, a flat or treaded step-forming surface is formed below the license plate pocket, as well as raised steps located beside and above the license plate pocket near corners of the vehicle.

The present arrangement provides a beam 24 optimally stably supported on the vehicle frame for providing desired levels of impact resistance at various locations along the beam. Fascia 25 and covers 26 and 27 cover the beam and are supported by the beam, with the components 25-27 being selectively painted or chrome plated for aesthetics. The covers 26 and 27 are structural and when fixed to the ends of the beam 24 add strength, providing a hybrid beam with optimal strength in selected areas, while maintaining a low cost and weight. The tow bar 21 is combined with and complements the beam 24 for overall impact strength. The overall design is well-integrated and provides a design that is flexible, with functional features molded integrally into the beam 24.

Figure 7:
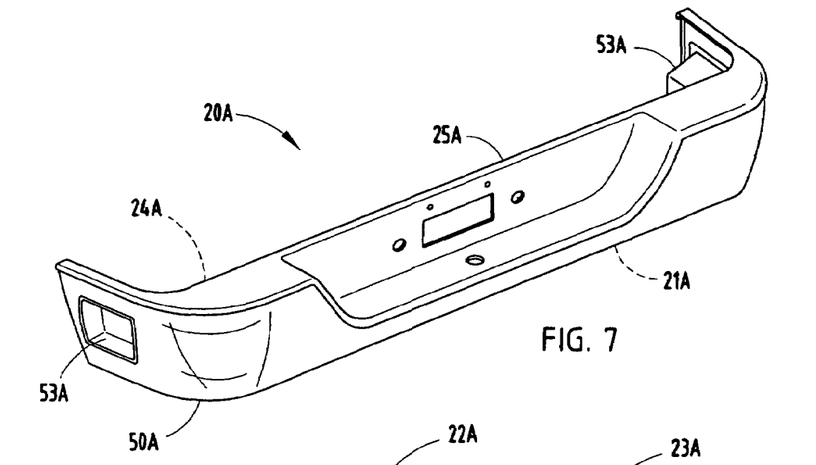
FIG. 7 is a perspective view of a modified bumper system embodying the present invention.
Figure 8:
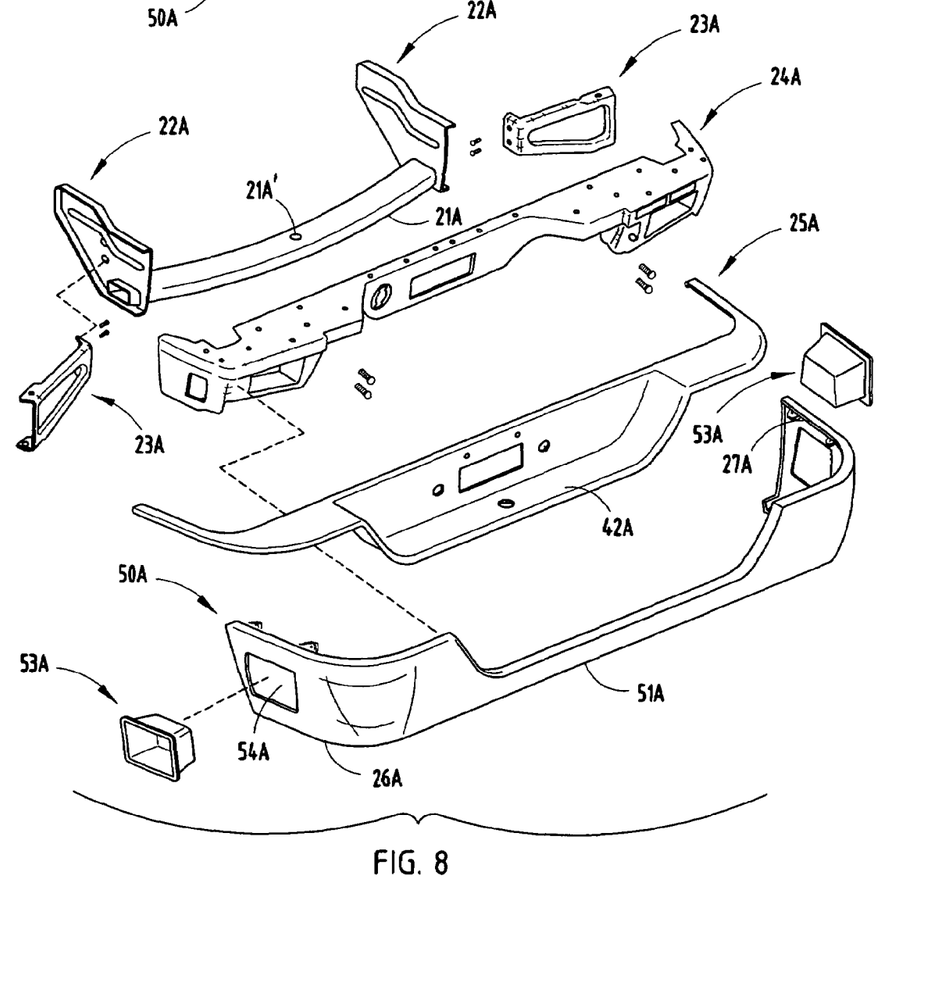
FIG. 8 is an exploded perspective view of the bumper system defined in FIG. 7.

A modified bumper system 20A (FIGS. 7-8) is a rear bumper system that includes components 21A-25A that are similar to the components 21-25 discussed above. In bumper system 20A, similar and identical components and features are identified using the same numbers but with the addition of the letter "A". This is done to reduce redundant discussion. In bumper system 20A, the structural cover 50A is a one-piece component that has a laterally extending strip 51A that interconnects the side cover portions 26A/27A. The strip 51A extends along under the recessed center section 42A. Further, a pair of mounting cans 53A are positioned in pockets 54A within the end cover portions 26A/27A for housing and supporting cornering lights and/or turn signals. The attachment structure for the cans can be integrally formed hooks or other attachment structure formed in the cover portions 26A/27A and shaped for snap-attachment, or can include apertured flanges for screw attachment, and/or can include surfaces for adhesive bonding. The fascia component 25A is made of a material that can be painted, molded in color, or chrome plated.

Figure 9:
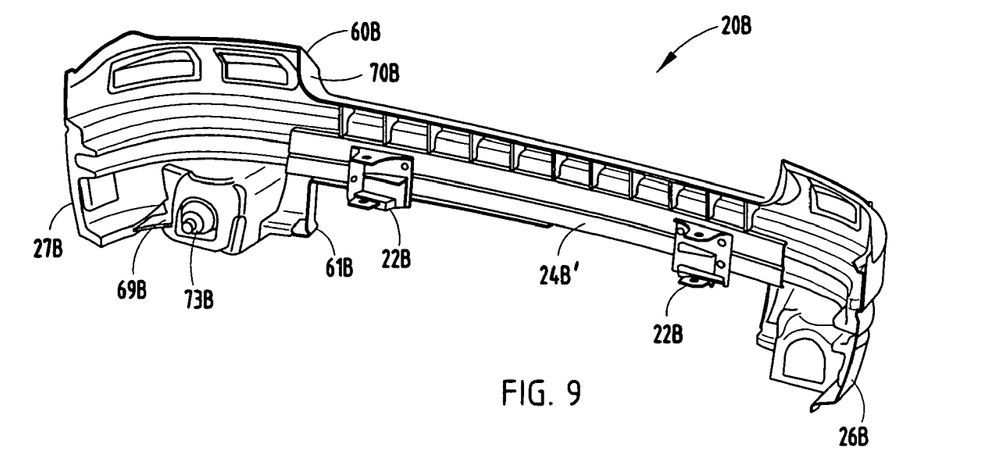
FIG. 9 is a rear perspective view of a front bumper system embodying the present invention.
Figure 10:
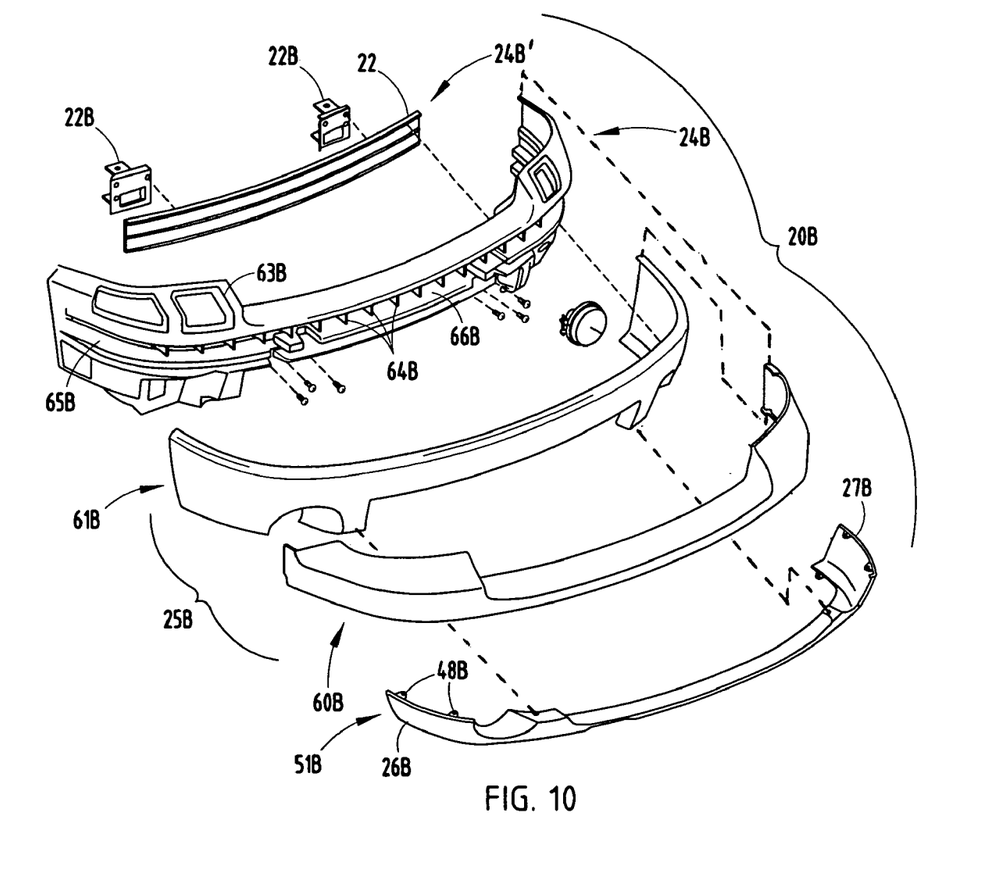
FIG. 10 is an exploded view of FIG. 9.

FIGS. 9-10 show a front bumper system 20B also incorporating many of the innovative features of the bumper systems 20 and 20A shown in FIGS. 1-8, including the ability to selectively chrome and/or paint components for a particularly distinctive "modularly styled" aesthetic appearance. In bumper system 20B, similar and identical components and features are identified using the same numbers as in systems 20 and 20A, but with the addition of the letter "B". This is done to reduce redundant discussion.

The hybrid bumper system 20B (FIGS. 9-10) is configured for a front of a vehicle. The bumper system 20B includes bracketry 22B (i.e., rail mounting brackets) bolted to the beam 24B and beam tie bar 24B' for supporting the beam 24B on a vehicle frame. The beam 24B includes a polymeric cross member of PC/PBT material and the tie bar 24B' is a roll-formed high-strength beam attached to its rear surface. The tie bar 24B' can be made of any material, including high-strength steel materials (e.g., 80 KSI) and ultra-high-strength materials (e.g., 120 KSI or more). A fascia 25B is formed by upper and lower fascia components 60B-61B that extend across the bumper system. The illustrated fascia components 60B-61B are elongated and extend a length of the beam cross member 24B' and are attached together along overlapping abutting edges, each covering respective portions of the reinforcement beam 24B. A structural cover 51B includes integrally-formed structural cover portions 26B/27B that attach to and cover lower/outer ends of the beam 24B, wrapping around ends of the beam 24B. The cover portions 26B and 27B are L-shaped and attached along multiple edges (such as top, bottom, inboard, and outboard edges) (see flanges 48 in FIG. 2) such that they add considerable strength to the ends of the beam 24B. It is noted that a hybrid beam construction could be designed having a construction similar to the hybrid beam shown in FIGS. 1-2, with the structural cover 26B and 27B being separate components.

The molded member 24B includes a variety of integrally formed mounting structures and utilitarian features. For example, the molded cross member 24B' includes fascia supporting walls 63B and surfaces that engage and support the fascia 25B for aesthetics and function. Also, the molded cross member 24B' includes integrally formed reinforcement ribs (such as vertical ribs 64B, FIG. 10) and surface undulations (such as horizontally-extending undulations 65B) for providing localized beam strength and also crush box structures 66B and honeycomb-shaped structures for impact energy absorption upon collapse. Also, various mounting structures are integrally formed on the cross member 24B', including a pattern of apertured bosses or holes at locations for the attachment of the tie bar 24B' and the bracketry 22B, mounts 69B for attachment of the fog lamps, and curvilinear surfaces 70B configured and positioned for allowing air flow through to the vehicle engine's radiator. It is noted that the fascia components 60B and 61B can also include integrally formed structures, such as mating surfaces that when coupled together form apertures and/or mounting structure for the fog lamps 73B and surfaces that form (with a front edge of the vehicle's hood) an enlarged aperture for air flow to the vehicle's radiator.

It is to be understood that variations and modifications can be made on the aforementioned structure without departing from the concepts of the present invention, and further it is to be understood that such concepts are intended to be covered by the following claims unless these claims by their language expressly state otherwise.

The exclusive property or privilege claimed includes:

1. A hybrid bumper system for a vehicle comprising:
a polymeric reinforcement beam having a center section and end sections;
bracketry stably engaging the reinforcement beam and adapted for attachment to the vehicle for supporting the reinforcement beam on a vehicle frame in a stable condition;
a fascia covering at least a top portion of the reinforcement beam; and
structural covers attached to and covering at least part of the end sections of the reinforcement beam, the structural covers combining with the end sections to provide corner structures of greater strength than the end sections alone, but also including a visible surface revealed by the fascia, wherein the reinforcement beam includes a recess shaped to receive a license plate and includes attachment locations for attaching the license plate.

2. The bumper system defined in claim 1, wherein the structural covers include attachment flanges attached to the end sections along at least two adjacent edges of the structural covers.

3. The bumper system defined in claim 2, wherein the structural covers include edges and attachment flanges attached to the end sections along the edges of the structural covers.

4. The bumper system defined in claim 3, wherein the structural covers are L-shaped, and configured to extend along a front and along an outer end surface of the end sections of the beam.

5. The bumper system defined in claim 1, wherein the structural covers include attachment flanges attached to the end sections along top, bottom, inboard, and outboard edges of the structural covers.

6. The bumper system defined in claim 1, wherein the structural covers are L-shaped, and configured to extend along a front and along an outer end surface of the end sections of the beam.

7. The bumper system defined in claim 1, wherein at least one of the fascia and the covers include a surface treatment different than the other of the fascia and covers.

8. The bumper system defined in claim 1, wherein the structural covers are plated with an aesthetic material.

9. The bumper system defined in claim 1, wherein the structural covers are molded in color.

10. The bumper system defined in claim 1, wherein the bracketry includes main support brackets and also includes stabilizer brackets extending at an angle to the main support brackets.

11. The bumper system defined in claim 1, including a horizontally extending bar, and wherein at least one of the reinforcement beam and the bracketry includes structure for engaging and supporting the bar.

12. The bumper system defined in claim 1, wherein the structural covers have a relatively flat top surface and have sufficient strength for supporting a person standing thereon.

13. A hybrid bumper system for a vehicle comprising:
a polymeric reinforcement beam having a center section and end section;
bracketry stably engaging the reinforcement beam and adapted for attachment to the vehicle for supporting the reinforcement beam on a vehicle frame in a stable condition;
a fascia covering at least a top portion of the reinforcement beam; and
structural covers attached to and covering at least part of the end sections of the reinforcement beam, the structural covers combining with the end sections to provide corner structures of greater strength than the end sections alone, but also including a visible surface revealed by the fascia, including a horizontally extending bar, and wherein at least one of the reinforcement beam and the bracketry includes structure for engaging and supporting the bar, wherein the bar is a tow bar and includes holes for receiving a ball hitch.

14. A hybrid bumper system for a vehicle comprising:
a polymeric reinforcement beam having a center section and end section;
bracketry stably engaging the reinforcement beam and adapted for attachment to the vehicle for supporting the reinforcement beam on a vehicle frame in a stable condition;
a fascia covering at least a top portion of the reinforcement beam; and
structural covers attached to and covering at least part of the end sections of the reinforcement beam, the structural covers combining with the end sections to provide corner structures of greater strength than the end sections alone, but also including a visible surface revealed by the fascia, and a tie bar secured to the reinforcement beam.

15. A hybrid bumper system for a vehicle comprising:
a polymeric reinforcement beam having a center section and end section;
bracketry stably engaging the reinforcement beam and adapted for attachment to the vehicle for supporting the reinforcement beam on a vehicle frame in a stable condition;
a fascia covering at least a top portion of the reinforcement beam; and
structural covers attached to and covering at least part of the end sections of the reinforcement beam, the structural covers combining with the end sections to provide corner structures of greater strength than the end sections alone, but also including a visible surface revealed by the fascia, wherein the reinforcement beam includes integrally formed structural mounts for engaging and supporting an accessory selected from a group consisting of a vehicle license illuminating lamp, a fog lamp, a cornering lamp, a grill, a stone shield, and a wire management clip.

16. A bumper system for a vehicle comprising:
a hybrid reinforcement beam including a polymeric beam component and L-shaped structural cover components secured to outer end sections of the polymeric beam component to provide corner structures of greater strength than the end sections alone, but also including a visible surface revealed by the fascia, wherein the reinforcement beam includes integrally formed structural mounts for engaging and supporting an accessory selected from a group consisting of a vehicle license illuminating lamp, a fog lamp, a cornering lamp, a grill, a stone shield, and a wire management clip;
a tie bar secured to the reinforcement beam;
bracketry stably engaging the reinforcement beam and adapted for attachment to the vehicle for supporting the reinforcement beam on a vehicle frame in a stable condition;
a fascia covering at least part of a center section of the reinforcement beam and not revealing a visible portion of the L-shaped structural cover components; and
at least one of the fascia and structural cover components including a surface treatment different than the other of the fascia and structural cover components.

17. The bumper system defined in claim 16, wherein the surface treatment on the structural cover components provides a chrome-appearing surface.

18. The bumper system defined in claim 16, wherein the structural cover components are selectively molded in color or coated to have a particularly colored surface.

* * * * *

UNITED STATES PATENT AND TRADEMARK OFFICE
CERTIFICATE OF CORRECTION

PATENT NO.         : 7,552,955 B2                                         Page 1 of 1
APPLICATION NO. : 11/414996
DATED              : June 30, 2009
INVENTOR(S)        : Darin Evans It is certified that error appears in the above-identified patent and that said Letters Patent is hereby corrected as shown below:

Column 7, line 41;

"bumber" should be --bumper--;

Column 8, line 52;

"and not revealing" should be --and revealing--.

Signed and Sealed this

Seventeenth Day of November, 2009

David J. Kappos
*Director of the United States Patent and Trademark Office*